United States Patent
Jones (10) Patent No.: US 12,204,406 B2
(45) Date of Patent: Jan. 21, 2025

(54) WEIGHTED ALTERNATING PATHS IN GRAPHS FOR QUANTUM COMPUTING

(71) Applicant: Google LLC, Mountain View, CA (US)

(72) Inventor: Nathan Cody Jones, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/510,754

(22) Filed: Nov. 16, 2023

(65) Prior Publication Data
US 2024/0086279 A1 Mar. 14, 2024

Related U.S. Application Data

(62) Division of application No. 17/541,433, filed on Dec. 3, 2021.

(60) Provisional application No. 63/121,027, filed on Dec. 3, 2020.

(51) Int. Cl.
G06N 10/00 (2022.01)
G06F 11/10 (2006.01)
G06F 16/901 (2019.01)

(52) U.S. Cl.
CPC ...... *G06F 11/1048* (2013.01); *G06F 16/9024* (2019.01); *G06N 10/00* (2019.01)

(58) Field of Classification Search
CPC .... G06F 11/1048; G06N 10/00; G06N 10/40; G06N 10/60; G06N 10/70
USPC .......................................................... 714/3
See application file for complete search history.

(56) References Cited

U.S. PATENT DOCUMENTS

| | | |
|---|---|---|
| 6,199,192 B1 | 3/2001 | Marquez et al. |
| 2019/0332731 A1 | 10/2019 | Chen et al. |
| 2020/0184031 A1 | 6/2020 | Horii |
| 2020/0285987 A1 | 9/2020 | Von Salis et al. |
| 2021/0019223 A1* | 1/2021 | Chamberland ........ G06N 10/20 |
| 2021/0390159 A1 | 12/2021 | De Carvalho, Jr. et al. |

(Continued)

OTHER PUBLICATIONS

Nishio et al., "Extracting Success from IBM's 20-Qubit Machines Using Error-Aware Compilation", arXiv: 1903.10963v1, 15 pages, Mar. 26, 2019.

(Continued)

*Primary Examiner* — Chae M Ko
(74) *Attorney, Agent, or Firm* — DORITY & MANNING P.A.

(57) ABSTRACT

A computer-implemented method for expanding a set of matched nodes in a partially-matched graph can include obtaining, by a computing system, a partially-matched graph having a matching set, the partially-matched graph including one or more edges and a plurality of nodes, the one or more edges having a matching label. The method can include obtaining at least two unmatched nodes. The method can include determining an alternating path from a first unmatched node of the at least two unmatched nodes to a second unmatched node of the at least two unmatched nodes, the alternating path including at least one edge of the one or more edges. The method can include inverting the matching label of the at least one edge of the alternating path such that the at least two unmatched nodes are included in the matching set of the partially-matched graph.

11 Claims, 7 Drawing Sheets

(56) References Cited

U.S. PATENT DOCUMENTS

2022/0269963 A1* 8/2022 Delfosse ............. G06F 16/9024

OTHER PUBLICATIONS

Murali et al., "Noise-Adaptive Compiler Mappings for Noisy Intermediate-Scale Quantum Computers", arXiv:1901.11054v1, 14 pages, Jan. 30, 2019.
Edmonds, "Paths, Trees, and Flowers", Canadian Journal of Mathematics, vol. 17, 1965, pp. 449-467, 19 pages.
Fowler, et al., "Topological Code Autotune", American Physical Society, Oct. 17, 2012, 13 pages.
Gabow, "Data Structures for Weighted Matching and Extensions to b-matching and f-factors", ACM Transactions on Algorithms, vol. 14, No. 39, 2018, pp. 1-80.
International Search Report and Written Opinion for Application No. PCT/US2021/060965, mailed May 30, 2022, 17 pages.
International Preliminary Report on Patentability for Application No. PCT/US2021/060965, mailed Jun. 15, 2023, 12 pages.

\* cited by examiner

WEIGHTED ALTERNATING PATHS IN GRAPHS FOR QUANTUM COMPUTING

PRIORITY CLAIM

The present application is a divisional of U.S. application Ser. No. 17/541,433, filed on Dec. 3, 2021, titled "Weighted Alternating Paths in Graphs for Quantum Computing", which claims the benefit of priority of U.S. Provisional Application Ser. No. 63/121,027, filed on Dec. 3, 2020, titled "Algorithm for Computing Costs for Weighted Alternating Paths in Graphs for Quantum Computing," which is incorporated herein by reference.

FIELD

The present disclosure relates generally to algorithms for computing cost of weighted alternating paths in graphs, and more particularly to algorithms for computing cost of weighted alternating paths in error graphs for quantum computing systems.

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as $a|0\rangle + b|1\rangle$. The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for expanding a set of matched nodes in a partially-matched graph. The method can include obtaining, by a computing system including one or more computing devices, a partially-matched graph having a matching set, the partially-matched graph including one or more edges and a plurality of nodes, the one or more edges having a matching label. The method can include obtaining, by the computing system, at least two unmatched nodes. The method can include determining, by the computing system, an alternating path from a first unmatched node of the at least two unmatched nodes to a second unmatched node of the at least two unmatched nodes, the alternating path including at least one edge of the one or more edges. The method can include inverting, by the computing system, the matching label of the at least one edge of the alternating path such that the at least two unmatched nodes are included in the matching set of the partially-matched graph.

In some implementations, at least one of the nodes can be a boundary node. The boundary node may have a boundary status that does not change such that a boundary node is neither matched nor isolated. A boundary node may be matched any suitable number of times, such as zero or more times. In some implementations, the algorithm as described herein can be configured such that an alternating path is found from an unmatched node to a boundary node. For instance, the boundary node may always behave as an unmatched node for the purposes of finding an alternating path, as the boundary node is always available to be matched regardless of any preexisting matches.

Another example aspect of the present disclosure is directed to a method for error detection in a quantum computing system. The method can include obtaining, by a computing system including one or more computing devices, a matched graph including one or more edges and a plurality of nodes, the plurality of nodes corresponding to a plurality of qubits of a quantum computing system, the one or more edges having a matching label. The method can include obtaining, by the computing system, an error detection signal including a first endpoint and a second endpoint, the first endpoint and the second endpoint corresponding to a first qubit and a second qubit of the plurality of qubits. The method can include determining, by the computing system, an alternating path from the first endpoint to the second endpoint, the alternating path including at least one edge of the one or more edges. The method can include detecting, by the computing system, at least one error position in the quantum computing system based at least in part on the alternating path.

Another example aspect of the present disclosure is directed to a quantum computing system. The quantum computing system can include quantum hardware including a plurality of qubits. The quantum hardware can include one or more classical processors. The one or more classical processors are configured to perform operations. The operations can include obtaining a matched graph including one or more edges and a plurality of nodes, the plurality of nodes corresponding to the plurality of qubits, the one or more edges having a matching label. The operations can include obtaining an error detection signal including a first endpoint and a second endpoint, the first endpoint and the second endpoint corresponding to a first qubit and a second qubit of the plurality of qubits. The operations can include determining an alternating path from the first endpoint to the second endpoint, the alternating path including at least one edge of the one or more edges. The operations can include detecting at least one error position in the quantum hardware based at least in part on the alternating path.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Example aspects of the present disclosure are directed to systems and methods for expanding a matching (e.g., a matching set of matched and/or isolated nodes and/or edges) of a partially-matched graph and/or computing cost of weighted alternating paths in the graph. In particular, systems and methods described herein can be useful in error detection of a quantum computing system including one or more qubits. The graph can include one or more nodes and/or one or more edges. Each edge can be shared by two nodes. For instance, each edge can connect a first node to a second node. The graph (e.g., the one or more edges) can have a matching set (e.g., a set of nodes and/or edges) such that each edge is one of "matched" or "unmatched." Additionally, a matching set may include nodes that are one of matched or isolated. Two nodes are considered to be matched if the nodes share a matched edge. A node may share a matched edge with at most one other node. For instance, according to constraints of a graph, a node may be linked to at most one matched edge. As another example, the set of matched edges may be a set of edges having no nodes or vertices common to two edges. A node having no matched edges is an isolated node. In some implementations, the edges may be weighted edges. For instance, each edge can have an associated weight.

It should be understood that example aspects of the present disclosure will be discussed with reference to matching labels at the nodes (e.g., matched node vs. isolated node) and edges (e.g., matched edge vs. unmatched edge). In some implementations, the matching may be represented using only matching labels, and a matched node may conventionally refer to a node sharing a matched edge. A pair of matched nodes can thus refer to both nodes of a matched edge. Additionally and/or alternatively, node labels can be applied to the nodes indicating whether a node is matched, isolated and/or unmatched.

According to example aspects of the present disclosure, one or more unmatched nodes can be introduced to and/or otherwise present in the graph. A matching of the graph may be expanded to include the unmatched nodes. As used herein, an "unmatched node" refers to a node that is neither matched nor isolated, e.g. a node that is not at present included in the matching set of the graph. For instance, a partially-matched graph can include one or more unmatched nodes that are neither matched nor isolated when the graph is partially matched. The unmatched nodes may be connected to only unmatched edges, but may become either matched or isolated in a solution of the partially-matched graph. For instance, a set of matched nodes and/or edges in the partially-matched graph may be expanded to include the unmatched nodes, such as by altering matching labels of edges in the graph to include some or all of the unmatched nodes. The set of nodes and/or edges having a matching can be expanded while satisfying one or more constraints of the matching. As one example, a constraint can be that nodes are either part of a matched pair with exactly one other node or isolated. As another example, a constraint can be that each node can touch at most one matched edge.

Additionally and/or alternatively, the matching of the graph can be expanded with respect to a cost function, such as to optimize (e.g., minimize and/or maximize) a cost function. For instance, in some implementations, the cost function can be based at least in part on edge weights of the matched edges. For example, the cost function can seek to minimize the sum of edge weights of the set of matched edges. The cost function may reward lower edge weights and/or penalize higher edge weights when an edge is included in the matched set. As another example, the cost function may be selected to minimize the cost of an alternating path from a first unmatched node to a second unmatched node.

Example aspects of the present disclosure can include an algorithm for computing a reassignment of matching labels given a graph and a partial matching of the graph (e.g., an assignment of matching labels that covers a subset of the nodes and/or edges in the graph) that expands the partial matching. The algorithm can expand the partial matching to a complete matching over one or more iterations of the algorithm. For example, the algorithm can be repeated over several iterations until each node and/or edge in the graph has a matched and/or isolated assignment to provide a complete matching of the graph.

In particular, this algorithm can include finding an alternating path, such as a minimum cost alternating path, and/or the cost of the alternating path from one unmatched node to another node, such as a second unmatched node. As used herein, an alternating path is a sequence of edges and/or nodes that alternates edges labeled unmatched and matched. In particular, if the matching labels of edges along an alternating path that terminates at an unmatched node are inverted, the matching remains valid and additionally includes the unmatched node in addition to each existing matched node. If the alternating path spans between two unmatched nodes, then both unmatched nodes are included in the new matching when the matching labels are inverted. In addition, the total cost of matched edges changes by the cost of the alternating path. In some implementations, the cost of the alternating path can be the sum of weights of all unmatched edges in the path minus the sum of weights of all matched edges in the path. Thus, by augmenting the path of minimum cost, the unmatched nodes are included in the matching with the lowest overall cost increase. This can be applied repeatedly to find the globally optimal weighted matching. In some implementations, path costs can be determined by constructing a tree rooted at an unmatched node. For every node reachable through the graph, a minimum-cost alternating path to the node and the path to reach it (the tree) can then be established. This can prevent the formation of cycles, which can be beneficial for quantum computing applications. In some implementations, the tree can be generated by a Bellman-Ford algorithm that is modified to avoid loops when generating the tree. For instance, the algorithm can be modified such that nodes which are ancestors of a present node are not visited as candidates for a next node in the tree.

According to example aspects of the present disclosure, this algorithm can be applied for error detection in quantum computing systems. For instance, the algorithm can be implemented by an error detection and/or error correction system for identifying errors in quantum computations. For instance, in some implementations, nodes of the matched graph can correspond to positions of one or more qubits in a quantum computing system. The existing matched graph can be a matched graph from a previous point in time. As one example, the one or more qubits can be arranged in a grid or array of qubits. For instance, nodes in the graph can correspond to coordinates of qubits within the array of qubits. The weights of edges in the graph can correspond to a likelihood of error at some point in the quantum computing system. These weights can be learned from historical usage data of the quantum computing system, estimated from simulations or design, or established by any other suitable method. For instance, higher weights may be assigned to points with a lesser likelihood of error such that a minimum cost path is also a most likely path over which an error will occur. The weights may be preexisting when the quantum computer is operating.

In some implementations, the qubit grid can include one or more computation qubits and one or more ancillary qubits. For instance, in some implementations, the qubit grid can be an interlaced grid of ancillary qubits and computation qubits. The computation qubits can perform computations for evaluation of one or more quantum algorithms. Additionally and/or alternatively, the ancillary qubits can be configured to monitor parity of the quantum computing system (e.g., the computation qubits) to detect errors in the quantum computing system.

For instance, in some implementations, a computing system can receive error information including coordinates describing endpoints of mismatched parity. For instance, the coordinates can correspond to positions of ancillary qubits in a qubit grid at which mismatched parity is detected. In some cases, the error information may be received in real time, such as in time slices and/or continuously. For instance, each time slice may correspond to a set of quantum gate operations at each of a plurality of qubits. The error information may be received with microsecond-level precision (e.g., half a microsecond). For instance, in some embodiments, the computing system may receive in real time error information including pairs of endpoints of mismatched parity.

Systems and methods according to example aspects of the present disclosure can provide for solving for a minimum cost alternating path between the pairs of endpoints. The minimum cost alternating path can be indicative of a most likely source of error resulting in the mismatched parity at the endpoints. Thus, the minimum cost alternating path can be indicative of a position of the computational qubit at which an error has occurred. For instance, the minimum cost alternating path can include an erratic qubit. In some cases, these errors can propagate through a quantum computation, and so prompt detection and/or correction can be beneficial.

Example aspects of the present disclosure are described herein with respect to quantum computing applications and error detection for the purposes of illustration. Example aspects of the present disclosure can be beneficial for evaluating errors in quantum computing systems. In addition, the general problem of weighted matching in graphs can be useful in other applications, including many engineering disciplines. Example aspects of the present disclosure can be applied to such other applications in accordance with the present disclosure.

Systems and methods according to example aspects of the present disclosure can provide for a number of technical effects and benefits, including but not limited to improvements to computing technology (e.g., quantum computing technology). For instance, example aspects of the present disclosure can provide for reduced evaluation time of error information, especially for smaller graphs, such as graphs including an order of magnitude of nodes that is comparable to an order of magnitude of qubits in an example quantum computing system. This is especially beneficial in quantum computing applications, in which it can be necessary to solve small graph problems quickly. For instance, it can be desirable to solve a two-endpoint error information problem as quickly as possible to meet precise timing requirements of quantum computing control systems, such as being fast enough such that the error can be accounted for and/or corrected. Especially in these cases, systems and methods according to example aspects of the present disclosure can have reduced evaluation time compared to some existing methods, such as, for example, the Blossom algorithm.

With reference now to the FIGS., example embodiments of the present disclosure will be discussed in further detail. As used here, the use of the term "about" in conjunction with a value refers to within 20% of the value.

Figure 1:
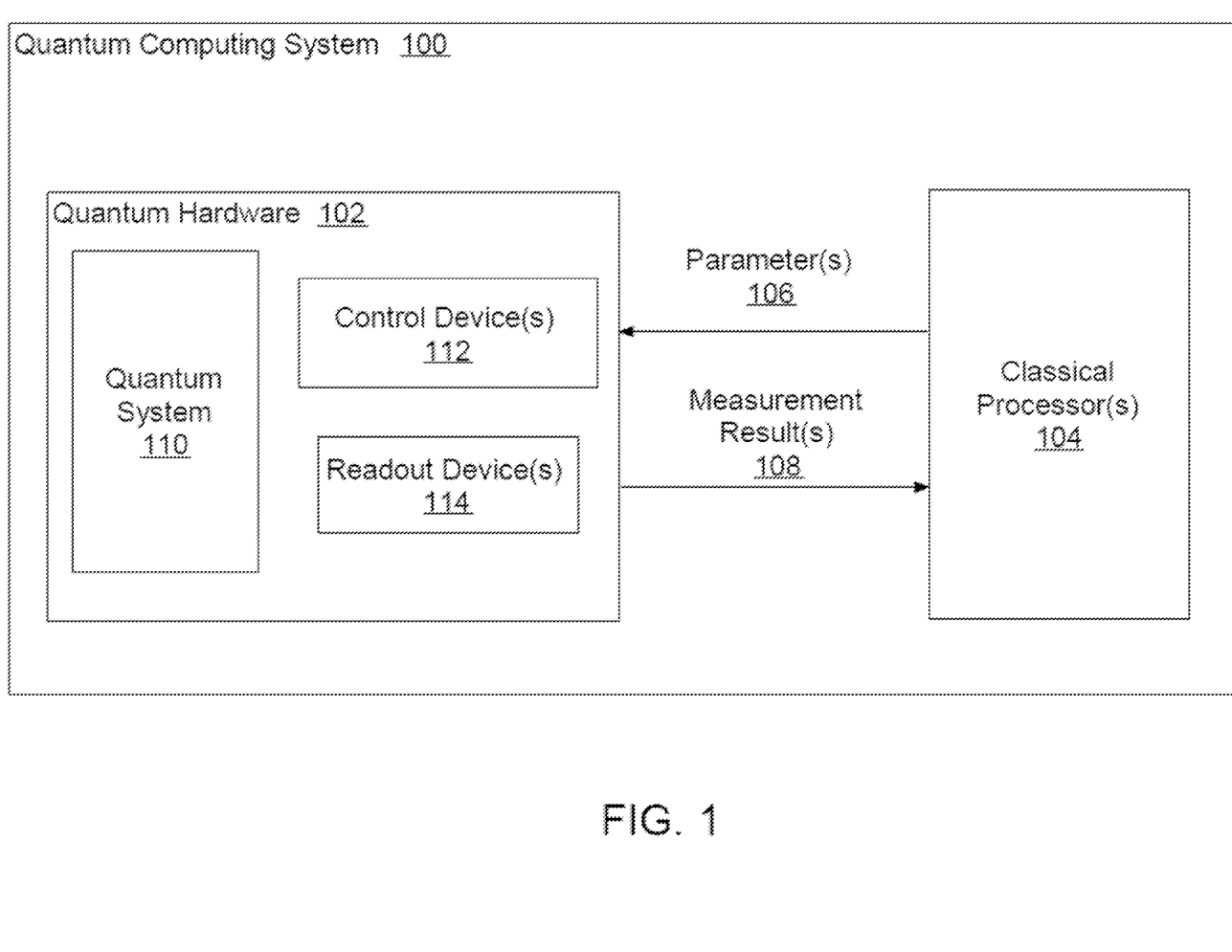
FIG. 1 depicts an example quantum computing system according to example embodiments of the present disclosure.

FIG. 1 depicts an example quantum computing system 100. The example system 100 is an example of a system on one or more classical computers or quantum computing devices in one or more locations, in which the systems, components, and techniques described below can be implemented. Those of ordinary skill in the art, using the disclosures provided herein, will understand that other quantum computing structures or systems can be used without deviating from the scope of the present disclosure.

The system 100 includes quantum hardware 102 in data communication with one or more classical processors 104. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits. In some implementations, the multi-level quantum subsystems can include superconducting qubits, such as flux qubits, charge qubits, transmon qubits, gmon qubits, etc.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit and the control device(s) 112 and readout devices(s) 114 may implement one or more quantum logic gates that operate on the quantum system 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameter values 106 from the classical processors 104. The quantum hardware 102 may use the received physical control qubit parameter values 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

The readout device(s) 114 can take advantage of a difference in the impedance for the |0⟩ and |1⟩ states of an element of the quantum system, such as a qubit, to measure the state of the element (e.g., the qubit). For example, the resonance frequency of a readout resonator can take on different values when a qubit is in the state |0⟩ or the state |1⟩, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

Figure 2:
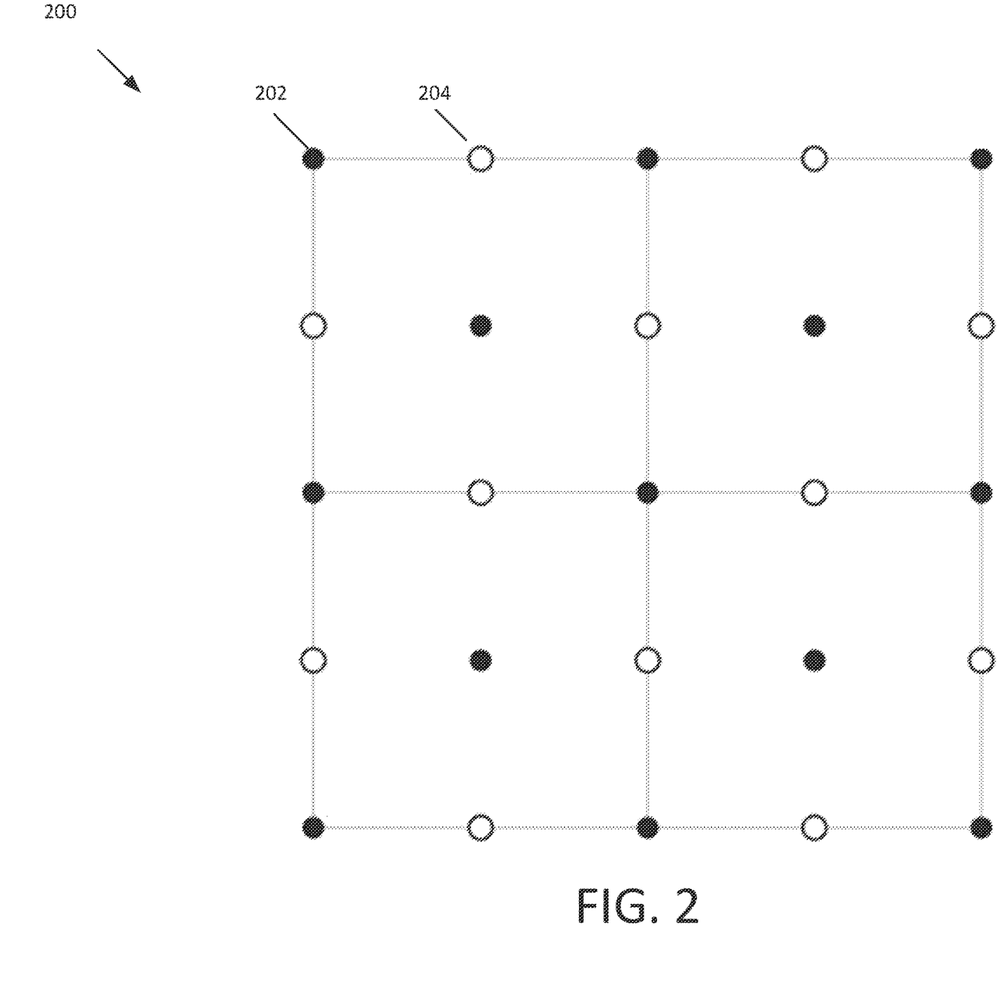
FIG. 2 depicts an example qubit grid according to example embodiments of the present disclosure.

FIG. 2 depicts an example qubit grid 200 according to example embodiments of the present disclosure. As illustrated in FIG. 2, qubit grid 200 can be an interlaced qubit grid of one or more ancillary qubits 202 (illustrated by solid circles) and/or one or more computation qubits 204 (illustrated by unshaded circles). The ancillary qubits 202 can be configured to measure errors (e.g., parity) in outputs of the computation qubits 204. For instance, some of all of the computation qubits 204 can have a time series of quantum gate operations defining a quantum algorithm across the some or all computation qubits 204. Errors in performance of these quantum gate operations can propagate through the qubit grid 200 and are eventually detected by parity checks at ancillary qubits 202. Error information including endpoints corresponding to coordinates of the ancillary qubits 202 responsible for the error detection is then generated and/or communicated to a control system for error detection and/or correction.

Figure 3:
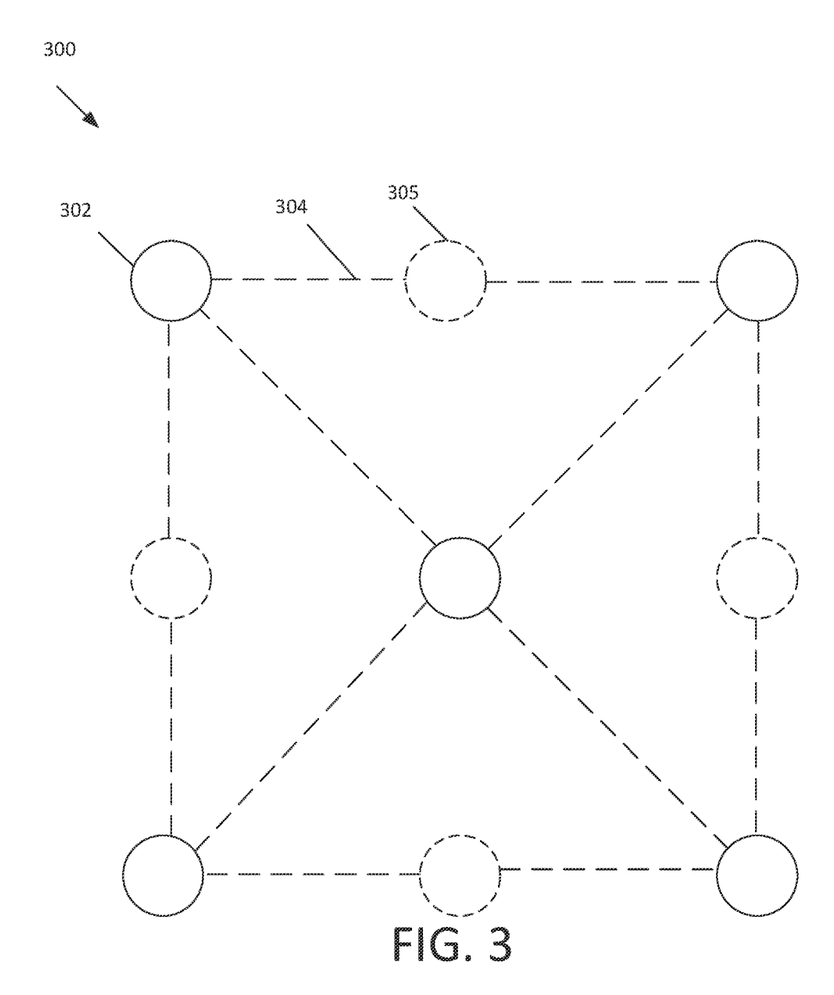
FIG. 3 depicts an example graph according to example embodiments of the present disclosure.

FIG. 3 depicts an example graph 300 according to example embodiments of the present disclosure. Graph 300 includes nodes 302 and edges 304. According to example aspects of the present disclosure, nodes 302 can correspond to ancillary qubits of a quantum computing system. As illustrated in FIG. 3, the nodes 302 can be connected by edges 304. Some or all of the edges 304 may be associated with a computation qubit 305. For instance, if error information including two nodes 302 as endpoints is received, the computation qubit(s) 305 responsible for the error can be associated with (e.g., matched) edges 304 of a minimum cost alternating path between the two nodes, according to example aspects of the present disclosure.

Figure 4A:
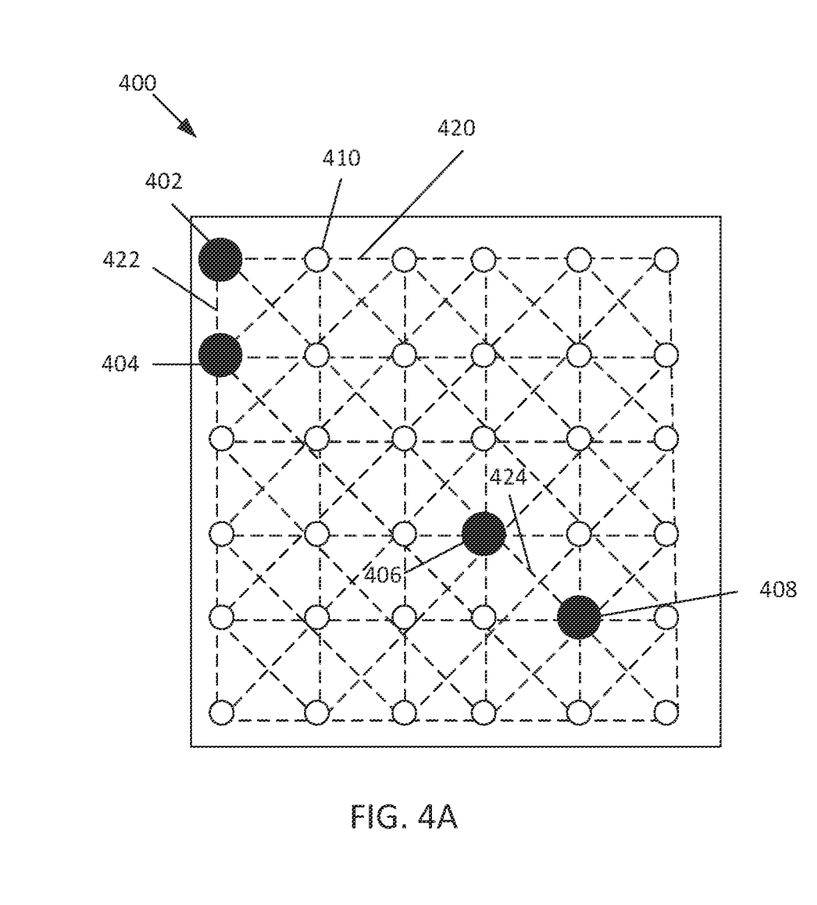
FIGS. 4A and 4B depict example graphs including error information according to example embodiments of the present disclosure.
Figure 4B:
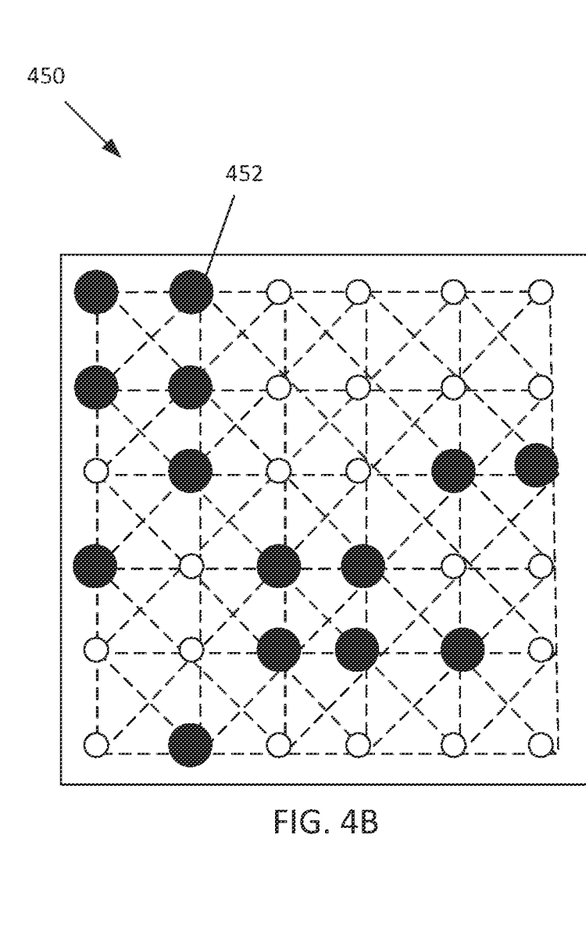

FIGS. 4A and 4B depict example graphs 400, 450 including error information according to example embodiments of the present disclosure. For instance, FIG. 4A depicts example graph 400 including error endpoints 402, 404, 406, and 408. Graph 400 can include nodes 410 and edges 420. The nodes can correspond to ancillary qubits. Additionally and/or alternatively, some or all of edges 420 can represent computation qubits. For example, in some implementations, each edge 420 can represent a single computation qubit. Additionally and/or alternatively, in some implementations, an edge can represent an error affecting more than one qubit, such as an ancilla qubit and a computation qubit. As illustrated, each node 410 can be connected to one or more other nodes 410 by edges 420. In some implementations, each edge 420 can have an associated weight. The endpoints 402, 404, 406, and 408 can correspond to ancillary qubits that detect error, such as ancillary qubits at which a parity check fails.

FIG. 4B depicts example graph 450 including a greater number of endpoints 452 than graph 400. For instance, graph 450 illustrates how solving for error positions can grow in complexity as the number of endpoints 452 grows. For instance, as can be understood from a comparison of FIGS. 4A and 4B, it can be easier to solve (e.g., assign matching edges to) graph 400 including fewer endpoints than graph 450 including a greater number of endpoints 452. For instance, it can be easily deduced (disregarding weights) that edge 422 may match endpoints 402 and 404 and that edge 424 is most likely to match endpoint 406 and 408. However, as can be seen in FIG. 4B, it can be more computationally complex to assign matchings to graph 450.

Example aspects of the present disclosure can provide for determining a matching of graphs 400 and/or 450. For instance, systems and methods according to example aspects of the present disclosure can assign matching labels of "matched" or "unmatched" (or other similar binary quality) to edges 420 such that each endpoint (e.g., 402-408) is included in the matching. For instance, systems and methods according to example aspects of the present disclosure can find a minimum cost alternating path from a first unmatched node (e.g., a first endpoint) to a second unmatched node (e.g., a second endpoint). For instance, the minimum cost alternating path can include edges corresponding to qubits that are most likely to have caused the error endpoints. The matching labels along the alternating path can be inverted, resulting in a new optimal (e.g., lowest-cost) matching including the unmatched nodes. This can be repeated until the overall optimal (e.g., most likely) solution is achieved. In this manner, the propagation of the error through the system and/or multiple errors can continuously be accounted for while the quantum computing system operates.

Figure 5:
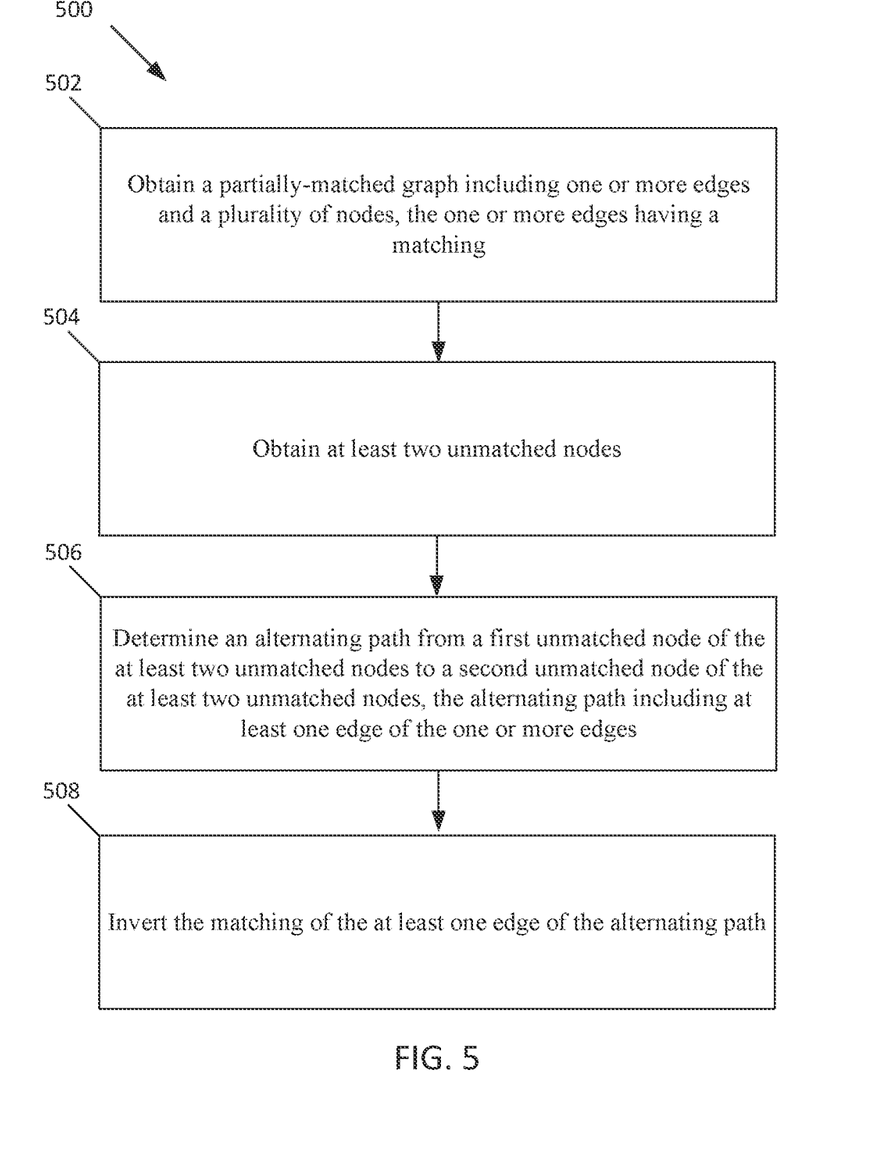
FIG. 5 depicts a flow chart diagram of an example method for expanding a set of matched nodes in a partially-matched graph according to example embodiments of the present disclosure.

FIG. 5 depicts a flow chart diagram of an example method 500 for expanding a set of matched nodes in a partially-matched graph according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

The method 500 can include, at 502, obtaining (e.g., by a computing system including one or more computing devices) a partially-matched graph including one or more edges and a plurality of nodes. The one or more edges can have a matching. For instance, matching labels can be assigned to the one or more edges indicating whether the edges are matched or unmatched. For instance, in some implementations, the matching can be or can include, for each edge, an matching label indicating one of a matched edge having a matched condition or an unmatched edge having an unmatched condition. The graph can define matched nodes and/or edges according to certain constraints. For instance, in some implementations, the graph is matched such that each of the plurality of nodes touches at most one matched edge.

In some implementations, each of the one or more edges can include a weight. For instance, in some implementations, each edge can be weighted based on a likelihood of error at that edge, such as in implementations wherein the graph corresponds to a plurality of qubits. For instance, in some implementations, the edge weights can be established based at least in part on a prior analysis and/or simulation of a quantum computing system. In some implementations, the weight can be inversely related to a likelihood of error. For example, an edge having a low likelihood of error can have a high weight.

The method 500 can include, at 504, obtaining (e.g., by the computing system) at least two unmatched nodes. For instance, the at least two unmatched nodes can be new nodes, such as nodes that were not in the graph prior to obtaining the at least two unmatched nodes. Additionally and/or alternatively, the at least two unmatched nodes may be existing nodes with an updated status, such as nodes that have been toggled as unmatched from a prior matching (e.g., matched and/or unmatched). In some implementations, the at least two unmatched nodes can be or can include endpoints (e.g., a first endpoint and/or a second endpoint) included in error information from a quantum computing system.

The method 500 can include, at 506, determining, by the computing system, an alternating path from a first unmatched node of the at least two unmatched nodes to a second unmatched node of the at least two unmatched nodes. The alternating path can include at least one edge of the one or more edges. For instance, the alternating path can alternate between matched edges and unmatched edges. As an example, a sequential ordering of edges from the first unmatched node to the second unmatched node can alternate between matched edges and unmatched edges. In some implementations, for alternating paths having only one edge, the edge may be either matched or unmatched.

In some implementations, the alternating path can be a minimum cost alternating path. For instance, in some implementations, a cost of the alternating path can be a sum of unmatched weights of unmatched edges in the alternating path with a sum of matched weights of matched edges in the alternating path subtracted from the sum of unmatched weights. For instance, in implementations for quantum computing error detection, an alternating path according to this cost function can thus correspond to a most likely path of errors.

In some implementations, determining the alternating path from the first unmatched node of the at least two unmatched nodes to the second unmatched node of the at least two unmatched nodes includes determining, by the computing system, a tree having a plurality of alternating paths from the first unmatched node to each of the plurality of nodes and selecting the alternating path from the tree. For instance, a tree of alternating paths from the selected unmatched mode to each node in the graph can be determined. Additionally and/or alternatively, the alternating paths can be minimum cost alternating paths. Thus, the alternating path resulting in the second unmatched node can be selected. The tree of alternating paths can be beneficial for avoiding cycles, which can be especially beneficial in quantum computing applications. For instance, in some implementations, none of the plurality of alternating paths can include a cycle. A cycle can be present in a path that uses a single edge at two or more instances. As another example, a cycle can be present in a path that includes a single node two or more times. The tree of alternating paths can be determined by any suitable algorithm. For instance, in some implementations, determining the tree including a plurality of alternating paths is performed by applying a Bellman-Ford algorithm. The Bellman-Ford algorithm may be modified to prevent the formation of cycles, such as by selecting only paths that do not include cycles. For instance, the algorithm may be prevented from visiting nodes that are ancestors of a present node.

The method 500 can include, at 508, inverting the matching label(s) of the at least one edge of the alternating path. For instance, once the alternating path is identified, the matching label of each edge along the alternating path can be inverted. For instance, matched edges along the alternating path can be inverted to unmatched edges and/or unmatched edges along the alternating path can be inverted to matched edges. According to example aspects of the present disclosure, inverting matching labels along an alternating path from a first unmatched node to a second unmatched node can expand the matching set of the graph to include the unmatched nodes while remaining valid for the existing nodes. Furthermore, if the minimum cost alternating path is inverted, the new matching can be an overall optimal matching (e.g., as defined by a cost function).

Figure 6:
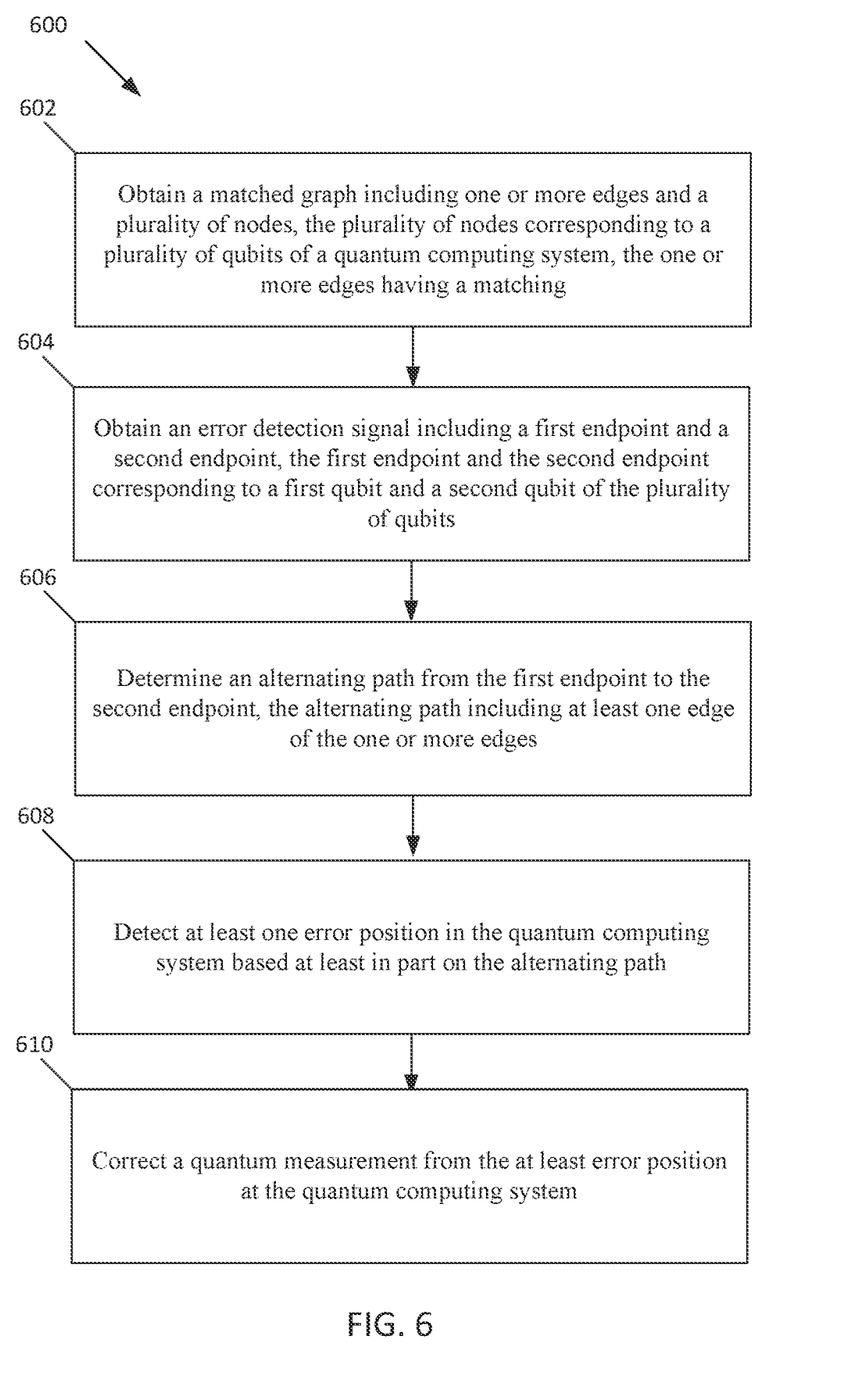
FIG. 6 depicts a flow chart diagram of an example method for error detection in a quantum computing system according to example embodiments of the present disclosure.

FIG. 6 depicts a flow chart diagram of an example method 600 for error detection in a quantum computing system according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

The method 600 can include, at 602, obtaining (e.g., by a computing system including one or more computing devices) a matched graph including one or more edges and a plurality of nodes. The one or more edges can have a matching. For instance, matching labels can be assigned to the one or more edges indicating whether the edges are matched or unmatched. For instance, in some implementations, the matching can be or can include, for each edge, an matching label indicating one of a matched edge having a matched condition or an unmatched edge having an unmatched condition. The graph can define matched nodes and/or edges according to certain constraints. For instance, in some implementations, the graph is matched such that each of the plurality of nodes touches at most one matched edge.

The plurality of nodes can correspond to a plurality of qubits of a quantum computing system. For instance, in some implementations, the plurality of qubits can correspond to an interlaced grid of qubits. The interlaced grid can include a plurality of computation qubits interlaced with a plurality of ancillary qubits. For instance, each of the nodes can correspond to an ancillary qubit. Additionally and/or alternatively, each of the one or more edges can correspond to a computation qubit. An example qubit grid is shown in FIG. 2. Any suitable qubit grid and/or other plurality of qubits can be employed in accordance with example aspects of the present disclosure.

In some implementations, each of the one or more edges can include a weight. For instance, in some implementations, each edge can be weighted based on a likelihood of error at that edge and/or nodes of the edge (e.g., qubits). For instance, in some implementations, the edge weights can be established based at least in part on a prior analysis and/or simulation of a quantum computing system. In some implementations, the weight can be inversely related to a likelihood of error. For example, an edge having a low likelihood of error can have a high weight.

The method 600 can include, at 604, obtaining (e.g., by the computing system) an error detection signal descriptive of a first endpoint and a second endpoint. For instance, in some implementations, the first endpoint and/or the second endpoint can be unmatched nodes in the matched graph. The first endpoint and the second endpoint can correspond to a first qubit and a second qubit of the plurality of qubits. For instance, in some implementations, the first endpoint and the second endpoint each correspond to an ancillary qubit. A computing system can receive error information including coordinates describing endpoints of mismatched parity. For instance, the endpoints can correspond to positions of ancillary qubits in a qubit grid at which mismatched parity is detected. In some cases, error information including the endpoints may be received in real time, such as in time slices and/or continuously. For instance, each time slice may correspond to a set of quantum gate operations at each of a plurality of qubits. The error information may be received with microsecond-level precision. For instance, in some embodiments, the computing system may receive in real time error information including pairs of endpoints of mismatched parity.

The method 600 can include, at 606, determining (e.g., by the computing system) an alternating path from the first endpoint to the second endpoint. The alternating path can include at least one edge of the one or more edges. For instance, the alternating path can alternate between matched edges and unmatched edges. As an example, a sequential ordering of edges from the first endpoint to the second endpoint can alternate between matched edges and unmatched edges. In some implementations, for alternating paths having only one edge, the edge may be either matched or unmatched.

In some implementations, the alternating path can be a minimum cost alternating path. For instance, in some implementations, a cost of the alternating path can be a sum of unmatched weights of unmatched edges in the alternating path with a sum of matched weights of matched edges in the alternating path subtracted from the sum of unmatched weights. For instance, in implementations for quantum computing error detection, an alternating path according to this cost function can thus correspond to a most likely path of errors.

In some implementations, determining the alternating path from the first endpoint of the at least two endpoints to the second endpoint of the at least two endpoints includes determining, by the computing system, a tree having a plurality of alternating paths from the first endpoint to each of the plurality of nodes and selecting the alternating path from the tree. For instance, a tree of alternating paths from the selected unmatched mode to each node in the graph can be determined. Additionally and/or alternatively, the alternating paths can be minimum cost alternating paths. Thus, the alternating path resulting in the second endpoint can be selected. The tree of alternating paths can be beneficial for avoiding cycles, which can be especially beneficial in quantum computing applications. For instance, in some implementations, none of the plurality of alternating paths can include a cycle. The tree of alternating paths can be determined by any suitable algorithm. For instance, in some implementations, determining the tree including a plurality of alternating paths is performed by applying a Bellman-Ford algorithm. The Bellman-Ford algorithm may be modified to prevent the formation of cycles, such as by selecting only paths that do not include cycles.

The method 600 can include, at 608, detecting (e.g., by the computing system) at least one error position in the quantum computing system based at least in part on the alternating path. For instance, the alternating path can be compared to the plurality of qubits to identify positions of errors in the quantum computation. As one example, matched edges can be indicative of erratic qubits. The position of error can thus correspond to, for example, a qubit index, coordinate, and/or other identifier.

In some implementations, the method 600 can further include, at 610, correcting, by the computing system, a quantum measurement from the at least error position at the quantum computing system. For example, in some implementations, the quantum algorithm in which the error was present can be rerun to correct the error. As another example, in some implementations, the measured value from the error location can be corrected and the quantum algorithm can continue evaluation with the corrected value.

Figure 7:
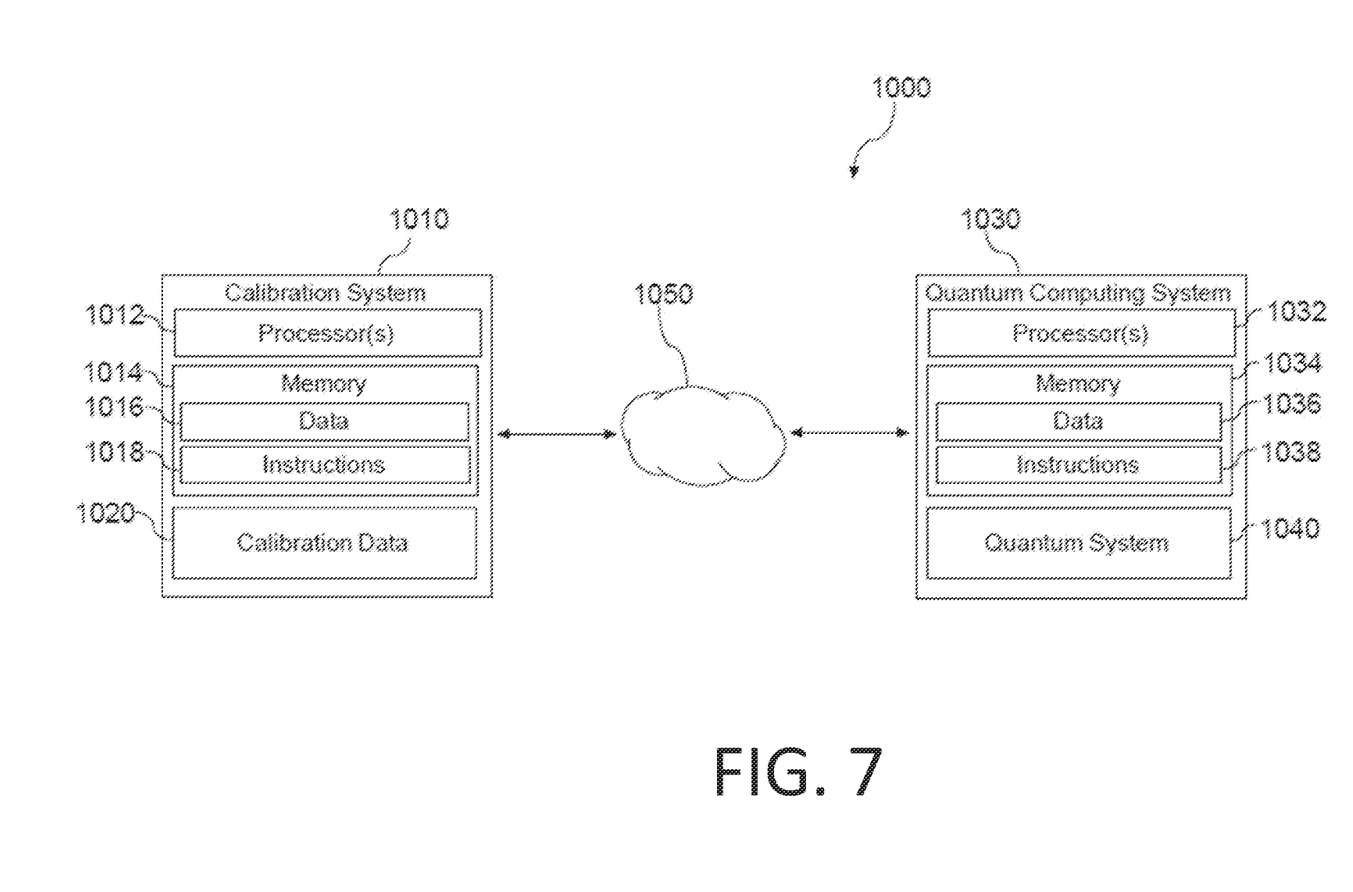
FIG. 7 depicts an example computing system according to example embodiments of the present disclosure.

FIG. 7 depicts a block diagram of an example computing system 1000 that can be used to implement the systems and methods according to example embodiments of the present disclosure, such as the system discussed with reference to FIG. 1. The system 1000 includes a control system 1010 and a quantum computing system 1030 that are communicatively coupled over a network 1050. One or more aspects of any of the methods described herein can be implemented on the control system 1010 and/or the quantum computing system 1030.

The control system 1010 can include any type of computing device (e.g., classical computing device). The control system 1010 includes one or more processors 1012 and a memory 1014. The one or more processors 1012 can include any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage mediums, such as RAM, ROM, EEPROM, EPROM, flash memory devices, magnetic disks, etc., and combinations thereof. The memory 1014 can store data 1016 (e.g., qubit parameters, measurements, etc.) and instructions 1018 which are executed by the processor 1012 to cause the control system 1010 to perform operations, such as one or more aspects of any of the method disclosed herein. The control system 1010 can be configured to process error information 1020 obtained by measuring outputs of a quantum system (e.g., quantum system 1040) to identify errors in quantum computations according to example embodiments of the present disclosure.

The quantum computing system 1030 includes one or more processors 1032 and a memory 1034. The one or more processors 1032 can include suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage mediums, such as RAM, ROM, EEPROM, EPROM, flash memory devices, magnetic disks, etc., and combinations thereof. The memory 1034 can store data 1036 and instructions 1038 which are executed by the processor 1032 to cause the quantum computing system 1030 to perform operations, such as implementation of a quantum circuit having one or more quantum gates on a quantum system 1040 having a plurality of qubits and obtaining associated measurements (e.g., error information 1020). The quantum computing system 1030 can be similar to the quantum computing system discussed and described with reference to FIG. 1. Other suitable quantum computing systems can be used without deviating from the scope of the present disclosure.

The network 1050 can be any type of communications network, such as a local area network (e.g., intranet), wide area network (e.g., Internet), or some combination thereof and can include any number of wired or wireless links. In general, communication over the network 1050 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). In some implementations, the network 1050 may be omitted such that the control system 1010 is in direct signal communication with quantum computing system 1030.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qudits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc..

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for error detection in a quantum computing system, the method comprising:
    obtaining, by a computing system comprising one or more computing devices, a matched graph comprising one or more edges and a plurality of nodes, the plurality of nodes corresponding to a plurality of qubits of a quantum computing system, the one or more edges having a matching label;

obtaining, by the computing system, an error detection signal comprising a first endpoint and a second endpoint, the first endpoint and the second endpoint corresponding to a first qubit and a second qubit of the plurality of qubits;

determining, by the computing system, an alternating path from the first endpoint to the second endpoint, the alternating path comprising at least one edge of the one or more edges; and detecting, by the computing system, at least one error position in the quantum computing system based at least in part on the alternating path.

2. The method of claim 1, further comprising correcting, by the computing system, a quantum measurement from the at least error position at the quantum computing system.

3. The method of claim 1, wherein the plurality of qubits comprises an interlaced grid of qubits, the interlaced grid comprising a plurality of computation qubits interlaced with a plurality of ancillary qubits.

4. The method of claim 1, wherein the first endpoint and the second endpoint each correspond to an ancillary qubit.

5. The method of claim 1, wherein each of the one or more edges corresponds to a computation qubit.

6. The method of claim 1, wherein determining, by the computing system, the alternating path from the first endpoint to the second endpoint comprises:

determining, by the computing system, a tree comprising a plurality of alternating paths from the first endpoint to each of the plurality of nodes; and selecting the alternating path terminating at the second endpoint from the tree.

7. The method of claim 1, wherein each of the one or more edges comprises a weight, and wherein the weight is based at least in part on a likelihood of error.

8. The method of claim 1, wherein the matching label is indicative of one of a matched edge having a matched condition or an unmatched edge having an unmatched condition, and wherein the alternating path alternates matched edges and unmatched edges.

9. The method of any of claim 1, wherein a cost of the alternating path comprises a sum of unmatched weights of unmatched edges in the alternating path with a sum of matched weights of matched edges in the alternating path subtracted from the sum of unmatched weights.

10. A quantum computing system, comprising:
quantum hardware comprising a plurality of qubits; and
one or more classical processors;
wherein the one or more classical processors are configured to perform operations, the operations comprising:
obtaining a matched graph comprising one or more edges and a plurality of nodes, the plurality of nodes corresponding to the plurality of qubits, the one or more edges having a matching label;
obtaining an error detection signal comprising a first endpoint and a second endpoint, the first endpoint and the second endpoint corresponding to a first qubit and a second qubit of the plurality of qubits;
determining an alternating path from the first endpoint to the second endpoint, the alternating path comprising at least one edge of the one or more edges; and
detecting at least one error position in the quantum hardware based at least in part on the alternating path.

11. The quantum computing system of claim 10, wherein at least one of the first endpoint or the second endpoint comprises a boundary node.

* * * * *